US008406343B2

(12) United States Patent
Hewavithana et al.

(10) Patent No.: US 8,406,343 B2
(45) Date of Patent: Mar. 26, 2013

(54) METHODS AND SYSTEMS TO RESOLVE CYCLIC AMBIGUITY OF A CHANNEL IMPULSE RESPONSE

(75) Inventors: Thushara Hewavithana, Borehamwood (GB); Bernard Arambepola, Enfield (GB); Parveen K. Shukla, Nottingham (GB); Sahan S. Gamage, Cambridge (GB); Vinesh Bhunjun, Potters Bar (GB)

(73) Assignee: Intel Corporation, Santa Clara, CA (US)

( * ) Notice: Subject to any disclaimer, the term of this patent is extended or adjusted under 35 U.S.C. 154(b) by 288 days.

(21) Appl. No.: 12/868,366

(22) Filed: Aug. 25, 2010

(65) Prior Publication Data

US 2012/0051471 A1 Mar. 1, 2012

(51) Int. Cl.
*H04L 27/26* (2006.01)
*H04L 27/06* (2006.01)

(52) U.S. Cl. ........................................ 375/316; 375/340

(58) Field of Classification Search .................. 375/260, 375/316, 340, 341, 377; 370/203, 208, 210
See application file for complete search history.

(56) References Cited

U.S. PATENT DOCUMENTS

| 7,630,450 B2* | 12/2009 | Duncan | 375/260 |
| 8,027,399 B2* | 9/2011 | Gore et al. | 375/260 |
| 2004/0190636 A1* | 9/2004 | Oprea | 375/260 |
| 2004/0192218 A1* | 9/2004 | Oprea | 455/73 |
| 2005/0073949 A1* | 4/2005 | Hayashi | 370/208 |
| 2007/0010203 A1 | 1/2007 | Wee et al. | |
| 2008/0198942 A1* | 8/2008 | Akella et al. | 375/260 |
| 2009/0052411 A1 | 2/2009 | Leung et al. | |
| 2009/0185612 A1 | 7/2009 | McKown | |
| 2009/0279626 A1 | 11/2009 | Wang | |
| 2010/0039233 A1 | 2/2010 | Niedzwiecki et al. | |
| 2010/0074348 A1* | 3/2010 | Xu | 375/260 |

FOREIGN PATENT DOCUMENTS

| WO | 2012/027061 A2 | 3/2012 |
| WO | 2012/027061 A3 | 4/2012 |

OTHER PUBLICATIONS

International search report and Written opinion received for PCT Patent Application No. PCT/US2011/045775, mailed on Feb. 20, 2012, 10 pages.
"DVB-T", From Wikipedia, the free encyclopedia, retrieved on May 27, 2010, 8 pages. Available at: http://en.wikipedia.org/wiki/DVB-T.

(Continued)

*Primary Examiner* — Tesfaldet Bocure
(74) *Attorney, Agent, or Firm* — Garrett IP, LLC

(57) ABSTRACT

Methods and systems to resolve cyclic ambiguity of a scattered-pilot based channel impulse response as a function of transmission parameter signalling (TPS), such as in a single frequency network, including to zero-pad a first orientation of the channel impulse response to an interval of an effective symbol duration of the multi-carrier signal, compute a channel frequency response from the zero-padded first orientation of the channel impulse response, and correlate components of the channel frequency response corresponding to frequencies of TPS carriers with raw channel frequency response data of obtained from the TPS carriers. Frequency response components of multiple zero-padded orientations of the channel impulse response may be correlated with the raw TPS carrier data to identify an optimum orientation of the channel impulse response. Frequency response components of subsequent zero-padded orientations may be iteratively computed from components of preceding orientations.

20 Claims, 13 Drawing Sheets

OTHER PUBLICATIONS

"Frame Structure Channel Coding and Modulation for a Second Generation Digital Terrestrial Television Broadcasting System (DVB-T2)", DVB-Digital Video Broadcasting, DVB Document A122, Jun. 2008, pp. 1-158.

"Digital Video Broadcasting (DVB); Framing structure, channel coding and modulation for digital terrestrial television", ETSI EN 300 744, V1.4.1 (Jan. 2001), European Standard (Telecommunications series), 2001, pp. 1-49.

RAI, "CD3: Pilot-free channel estimation for increased capacity in DVB-T2", Sep. 2007, 1 page.

"DVB-T/H Test", MG3700A, Application Note, Anritsu, Vector Signal Generator, Jun. 2007, 44 pages.

"Digital Video Broadcasting (DVB); DVB mega-frame for Single Frequency Network (SFN), synchronization", TS 101 191, V1.1.1 (Apr. 1997), Technical Specification, 1997, pp. 1-17.

"OFDM—DVBT Standard", retrieved on May 28, 2010, pp. 1-18. Available at http://www.kjmbc.co.kr/old/beta/ofdm/ofdm.html#5.

* cited by examiner

METHODS AND SYSTEMS TO RESOLVE CYCLIC AMBIGUITY OF A CHANNEL IMPULSE RESPONSE

BACKGROUND

An orthogonal frequency division multiplex (ODFM) signal may include scattered pilots on every $n^{th}$ carrier, which may be used to estimate channel frequency responses at scattered pilot carrier frequencies. Where channel frequency responses are only available for every $n^{th}$ carrier frequency, a corresponding channel impulse response may exhibit cyclic ambiguity, which may impact symbol timing recovery and channel equalization.

Cyclic ambiguity may be avoided by constraining echoes to lie within a time interval of Tu/2n of the strongest path, where Tu represents an effective symbol duration, and centering the channel impulse response at the strongest component. Such an approach may be sufficient for small to medium single frequency networks (SFNs), and non-SFN environments. For example, for 8K OFDM and n=3 in an 8 MHz channel of a relatively small SFN, Tu may be approximately 896 micro-seconds (μs), and it may be reasonable to assume that all pre and post echoes are within 150 μs (i.e. Tu/6) of a main path.

In larger SFN environments, post echo delays may exceed Tu/2n. If post-echoes are constrained to be within Tu/2n of a main path, a longer delay post-echo may appear as a pre-echo of a subsequent window, referred to herein as wrap-around.

For larger SFN environments, an estimated channel impulse response may be iteratively adjusted based on signal-to-noise ratios (SNRs) to identify an optimum or suitable placement. Trial and error placement at periodic intervals may, however, lead to loss of data.

BRIEF DESCRIPTION OF THE DRAWINGS/FIGURES

Figure 1:
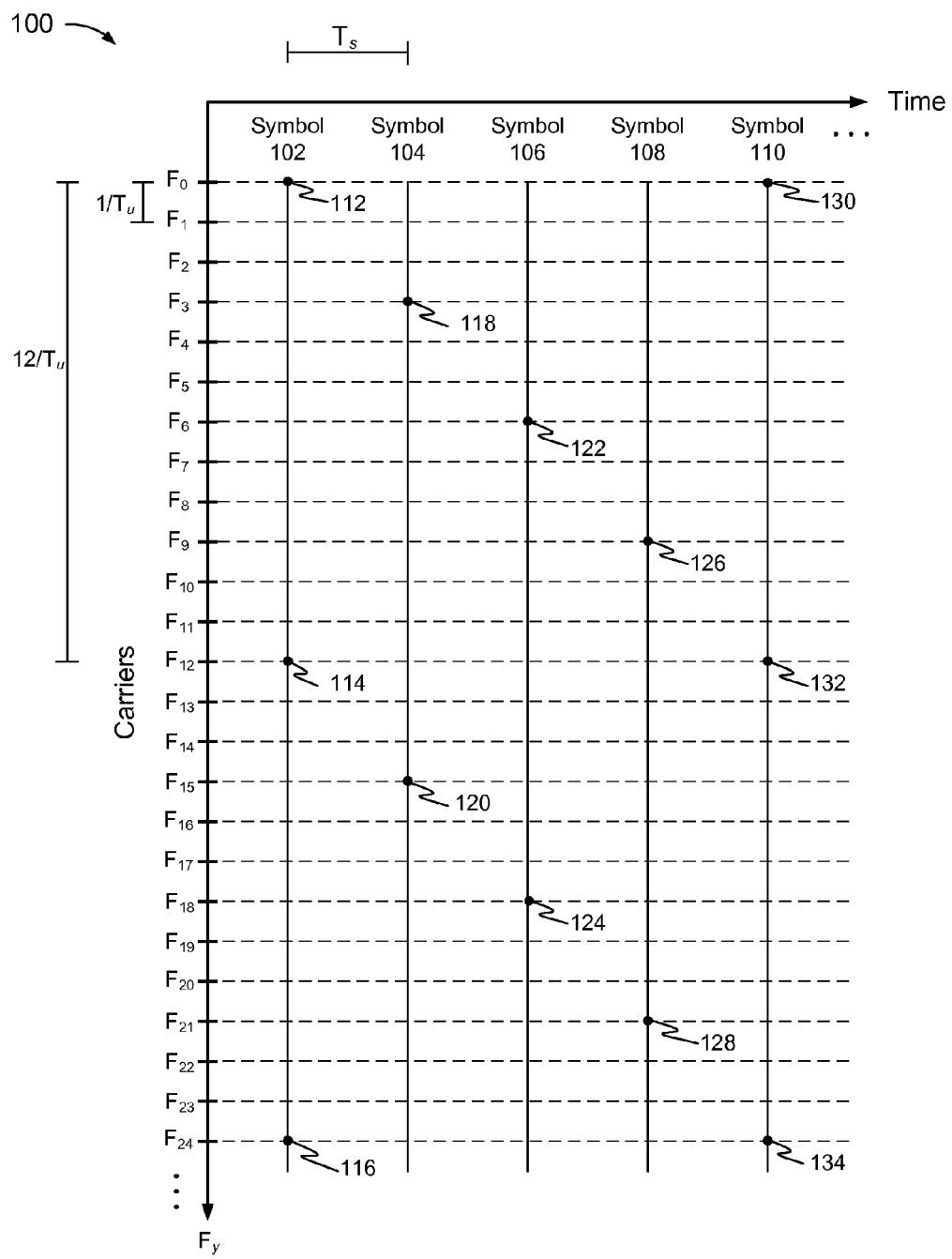
FIG. 1 is graphic depiction of carriers $f_0$ through $f_y$ of a multi-carrier signal, including scattered pilot carriers.

In the drawings, the leftmost digit(s) of a reference number identifies the drawing in which the reference number first appears.

DETAILED DESCRIPTION

FIG. 1 is graphic depiction of a multi-carrier signal 100, including carriers $f_0$ through $f_y$, over multiple symbols 102 through 110.

Signal 100 includes scattered pilots 112 through 134, which may adhere to a pattern specified by a digital video broadcast standard. In the example of FIG. 1, scattered pilots occur on every $12^{th}$ carrier of a given symbol, and are shifted by three carriers in each successive symbol. Over time, scattered pilot occur on every $n^{th}$ carrier, where n=3 in FIG. 1. Other scattered pilot patterns may be implemented. In FIG. 1, scattered pilots are arbitrarily illustrated as starting at carrier $f_0$ of symbol 102. Scattered pilots may begin at other carrier locations. Signal 100 may include other types of pilots, such as pilots that occur at the same frequency or frequencies, referred to as continuous pilots.

Signal 100 has a symbol period of $T_s=T_u-T_g$, where $T_u$ is a useful or effective symbol duration, and $T_g$ is a guard duration A guard ratio may be defined as $T_g/T_u$. Signal 100 may have a carrier spacing of $1/T_u$.

Multiple instances of signal 100 may be simultaneously transmitted from multiple locations at the same frequency, referred to as a single frequency network (SFN). A receiver will then receive the sum of multiple instances of signal 100 with different strengths and delays. Signal 100 may include an orthogonal frequency division multiplexed (OFDM) signal.

A channel frequency response may be estimated for every $n^{th}$ carrier from the scattered pilots, and for additional carriers from continuous pilots, such as with a conventional time axis filtering or prediction technique. Where a channel frequency response is estimated for every $n^{th}$ carrier, samples of the channel frequency response may have a frequency spacing of n/Tu, and a corresponding channel impulse response may correspond to a time interval of Tu/n. In other words, the channel impulse response may be generated with respect to a delay spread of Tu/n. For illustration purposes n=3 is used.

Figure 2:
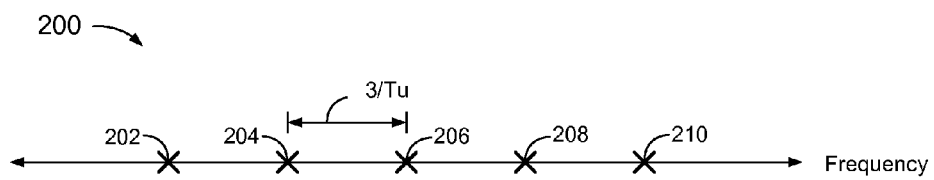
FIG. 2 is a graphic depiction of a channel frequency response of the signal of FIG. 1 after time axis interpolation or prediction.

FIG. 2 is a graphic depiction of a channel frequency response 200 of signal 100, having spectral content 202 through 210 at frequencies that are multiples of (3/Tu).

A channel impulse response may be computed from channel frequency response 200, such as described below with respect to FIG. 3.

Figure 3:
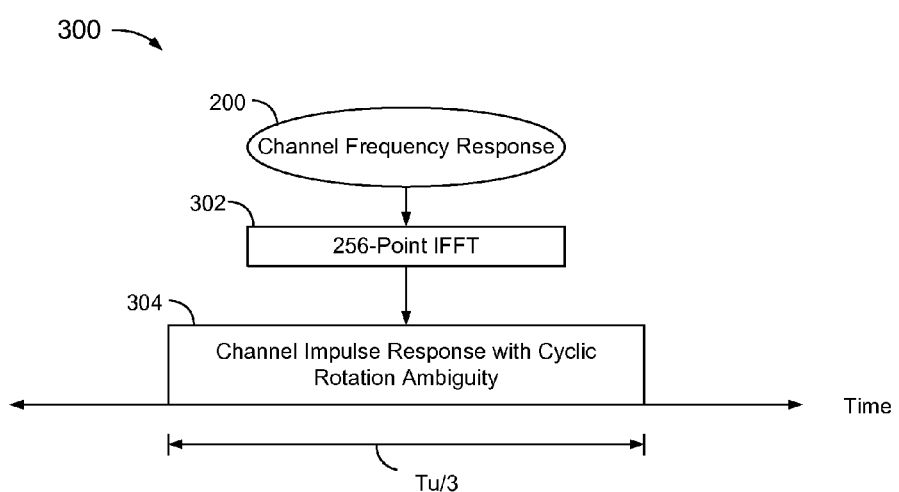
FIG. 3 is a graphic depiction of a channel impulse response computation.

FIG. 3 is a graphic depiction of a channel impulse response computation 300, where an Inverse Fast Fourier transform (IFFT) 302 is performed with respect to channel frequency response 200. IFFT 302 may compute, for example, a 256-point IFFT, to provide a 256-point sequence 304 in a time domain. Where a frequency separation of frequency response 200 is 3/Tu, 256-point sequence 304 may correspond to a time interval of Tu/3.

Figure 4:
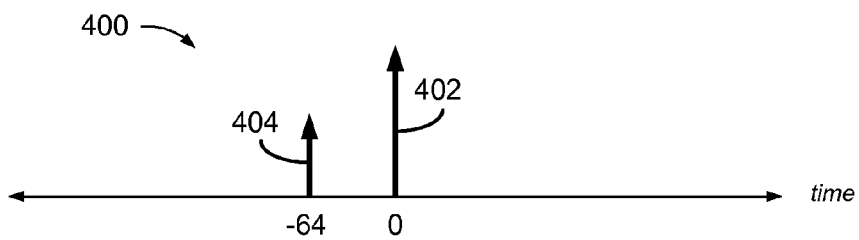
FIG. 4 is a graphic depiction of a channel impulse response corresponding to the channel frequency response of FIG. 2.

FIG. 4 is a graphic depiction of a channel impulse response 400, including first and second components 402 and 404. Components 402 and 404 may correspond to, for example, first and second transmitters of a SFN.

Channel impulse response 400 is described below as a 256-point channel impulse response derived from channel frequency response 200. Methods and systems disclosed herein are not, however, limited to 256-point channel frequency response or 256-point channel impulse responses.

Component 402 has a greater magnitude than component 404, and is referred to herein as a main component or main path of signal 100.

Where the frequency spacing of channel frequency response 200 is 3/Tu, impulse response 400 may have a periodicity of Tu/3. The referred to herein as channel impulse response cyclic ambiguity.

For example, in FIG. 4, component 404 appears as a relatively weak pre-echo, 64 points or samples prior main path component 402. Where the 256 samples of impulse response 400 correspond to Tu/3, the 64 samples correspond to Tu/12. Due to cyclic ambiguity, however, path 404 may correspond to a time that is 192 samples after main path 402, as illustrated in FIG. 5.

Figure 5:
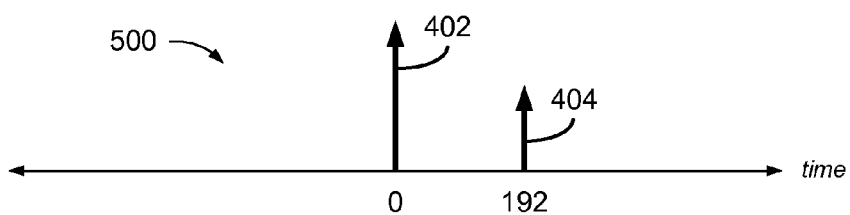
FIG. 5 is a graphic depiction of a rotated orientation of the channel impulse response of FIG. 4.

FIG. 5 is a graphic depiction of a channel impulse response 500, which represents the other orientation of channel impulse response 400. In FIG. 5, second component 402 occurs 192 samples after first component 402, which corresponds to a Tu/4 post-echo after main path 402. One of FIGS. 4 and 5 may represent a correct or optimum orientation of the channel impulse response. In a SFN environment, a channel impulse response may include substantially more components than illustrated in FIGS. 4 and 5.

Cyclic ambiguity between channel impulse responses 400 and 500, also referred to herein as wrap-around, is a result of the incomplete frequency response of FIG. 2, estimated from less than all carriers of a received signal.

Cyclic ambiguity may impact symbol timing recovery and/or channel equalization, which may lead to relatively poor receiver performance and possibly to a loss of data.

Cyclic ambiguity may be resolved with reference to carriers having parameters encoded with predetermined modulation and encoding schemes. Such carriers are referred to herein as parameter carriers.

Parameter carriers may include transmission parameter signalling (TPS) carriers. For example, in a digital video transmission signal, a subset of carriers of OFDM symbols may be (TPS) carriers, which may include QAM constellations and coding rates. TPS may adhere to a digital video broadcast standard, such as DVB-T, ISDB-T and/or SBTVD. The term parameter carrier, as used herein, is not, however, limited to TPS carriers.

Parameter carriers may be demodulated and decoded based on the predetermined modulation and encoding schemes, and an initial FFT trigger point. After parameters are decoded from the parameter carriers, the decoded parameters may be used to remove data modulation from the parameter carriers. Modulation-removed parameter carrier information may be referred to interchangeably herein as raw channel frequency response estimates, raw parameter carrier data, and raw data. Raw channel frequency response estimate data may include phase and/or amplitude information, and may be used to identify a suitable or optimum orientation of an estimated channel impulse response, which in turn may be used to refine the initial trigger point to an optimal FFT trigger position.

Figure 6:
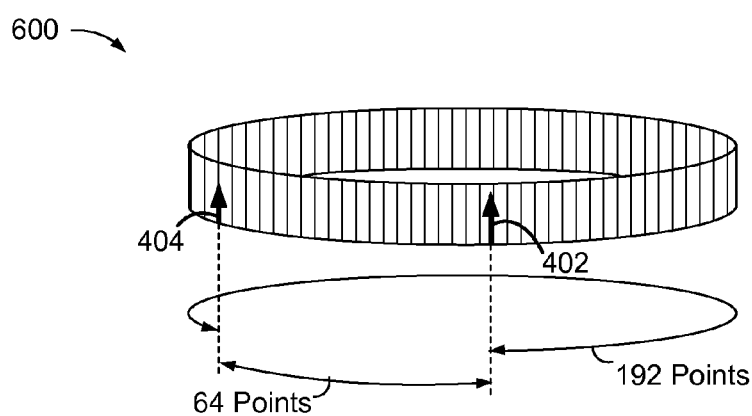
FIG. 6 is a cyclic depiction of a channel impulse response.

FIG. 6 is a cyclic depiction of samples or points 600, which may represent points of a channel impulse response. For illustrative purposes, points 600 are described below as a 256-point channel impulse response derived from channel frequency response 200, corresponding to an interval of Tu/3.

Points 600 include first and second components 402 and 404 of FIG. 4. There are 257 possible orientations of points 600. Due to cyclic ambiguity, an optimum orientation may be indeterminable from samples 600.

Resolution of cyclic ambiguity may include zero-padding multiple orientations of samples 600 to correspond to an interval of Tu, and comparing corresponding frequency response points, at frequencies of the parameter carriers, to the modulation-removed parameter carrier data.

Figure 7:
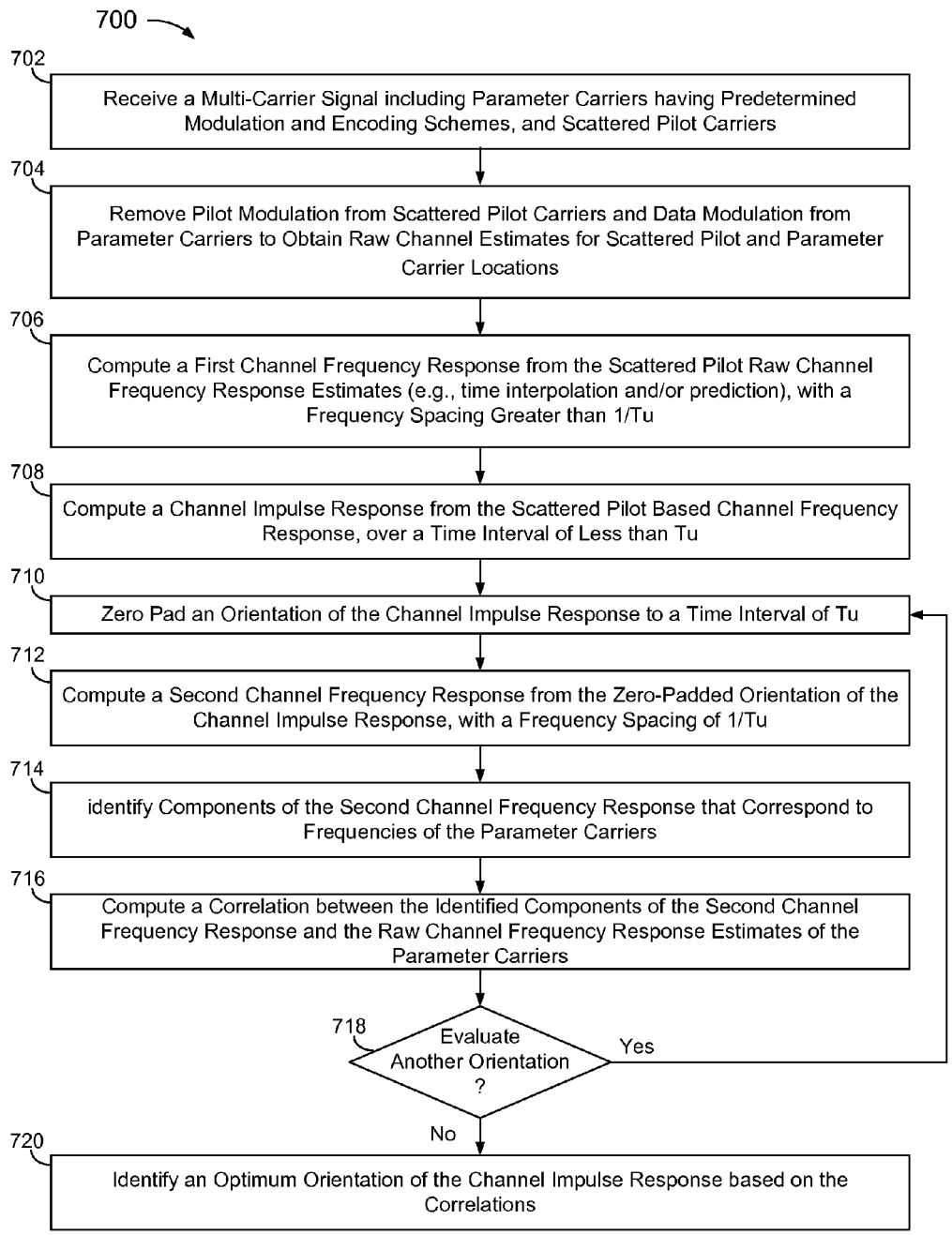
FIG. 7 is a flowchart of a method of resolving cyclic ambiguity in a channel impulse response.

FIG. 7 is a flowchart of a method 700 of resolving cyclic ambiguity in a channel impulse response. For illustrative purposes, method 700 is described with reference to FIGS. 8 through 12. Method 700 is not, however, limited to the examples of FIGS. 8 through 12.

At 702, a multi-carrier signal is received, including scattered pilot carriers and parameter carriers. The received signal may include multiple instances of the signal from multiple transmitters of an SFN network.

At 704, the received signal is demodulated, pilot modulation is removed from the scattered pilot carriers, and data modulation is removed from the parameter carriers. This provides raw channel frequency response estimates for scattered pilot and parameter carrier locations.

At 706, a first channel frequency response is estimated from the scattered pilot carriers. The first channel frequency response may be computed by time interpolation and/or prediction of the raw channel frequency response estimates of the scattered pilots to obtain an estimate for every $n^{th}$ carrier, with a frequency separation of n/Tu, in a given symbol. The first channel frequency response may be taken as 256 consecutive n carrier apart channel frequency response components. For example, a frequency spacing of the first channel frequency response may be 3/Tu, such as illustrated in FIG. 2.

Figure 8:
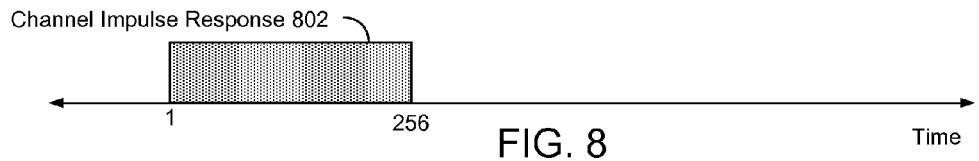
FIG. 8 is a graphic depiction of a 256-point channel impulse response.

At 708, a channel impulse response is computed from the first channel frequency response. The channel impulse response may be computed as a 256-point IFFT, and may correspond to a time interval of Tu/3. FIG. 8 is a graphic depiction of a 256-point channel impulse response 802.

At 710, an orientation of the channel impulse response is zero-padded to extend the channel impulse response to an interval of Tu. Zero-value points may be inserted at a position M of the channel impulse response. Where the channel impulse response includes 256 points, M may be from 0 to 256. Examples are illustrated in FIGS. 9 through 12.

Figure 9:
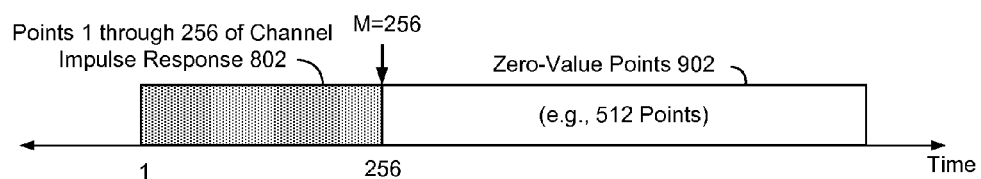
FIG. 9 is a graphic depiction of zero-padded points inserted at M=256 of the channel impulse response of FIG. 8.

FIG. 9 is a graphic depiction of zero-value points 902 inserted at M=256 of channel impulse response 802.

Figure 10:
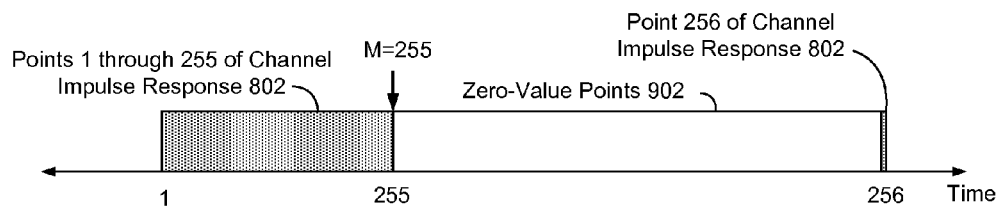
FIG. 10 is a graphic depiction of the zero-padded points inserted at M=255 of the channel impulse response of FIG. 8.

FIG. 10 is a graphic depiction of zero-value points 902 inserted at M=255, between points 255 and 256 of channel impulse response 802.

Figure 11:
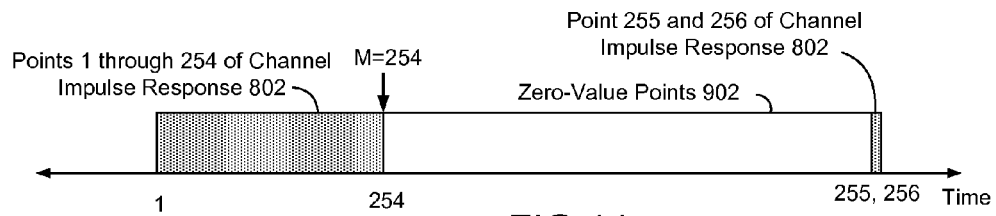
FIG. 11 is a graphic depiction of the zero-padded points inserted at M=254 of the channel impulse response of FIG. 8.

FIG. 11 is a graphic depiction of zero-value points 902 inserted at M=254, between points 254 and 255 of channel impulse response 802.

Figure 12:
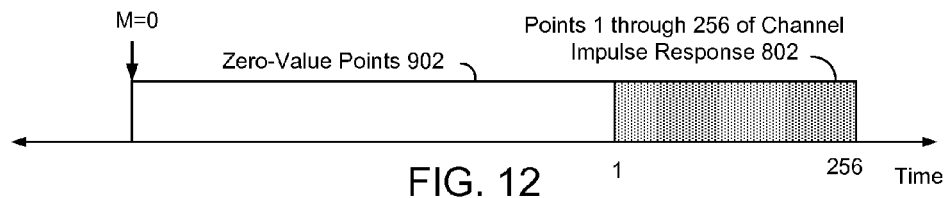
FIG. 12 is a graphic depiction of the zero-padded points inserted at M=0 of the channel impulse response of FIG. 8.

FIG. 12 is a graphic depiction of zero-value points 902 inserted at M=0, prior to point 1 of channel impulse response 802.

Where the 256-points of channel impulse response 802 correspond to Tu/3, zero-value points 902 may include 512 points to extend channel impulse response 802 to 768 points which, in this example, corresponds to a time interval of Tu.

As described below with respect to FIG. 13, zero-padding of a channel impulse response to obtain different channel impulse response orientations does not change the computed channel frequency response at scattered pilot carrier frequencies.

Figure 13:
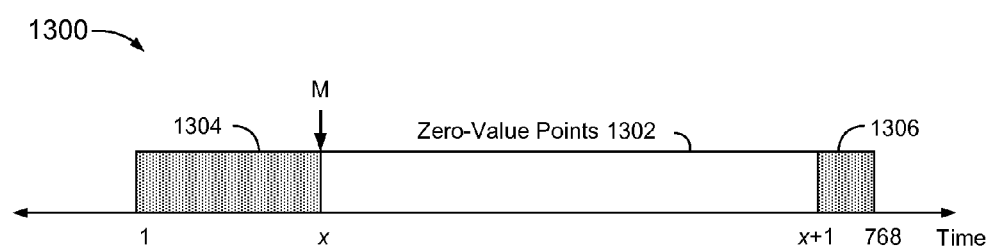
FIG. 13 is a graphic depiction of a channel impulse response, zero padded at M.

FIG. 13 is a graphic depiction of a channel impulse response 1300, including portions 1304 and 1306, and 512 zero-value points 1302 there between. Portion 1304 includes points 1 through x. Portion 1306 includes points x+1 through 768. M may range from 0 to 256.

A channel frequency response may be computed as a 768-point FFT or discrete Fourier Transform (DFT), such as in accordance with Eq. 1:

$$X(k) = \sum_{i=0}^{M} x(i)\exp\left(\frac{-j2\pi ik}{768}\right) + \sum_{i=M+513}^{767} x(i-512)\exp\left(\frac{-j2\pi ik}{768}\right) \quad \text{Eq. 1}$$

In Eq. 1, the summation term on the left corresponds to portion 1304, and the summation term on the right corresponds to portion 1306.

Where scattered pilots occur on every third carrier, the channel frequency response of the set of scattered pilot carriers, $\{3n/T_u\}$, may be determined by substituting:
k=3k' throughout Eq. 1; and
i'←i−512, in the summation term on the right in Eq. 1.

After the substitution, Eq. 1 may be expressed as Eq. 2, which may be simplified as Eq. 3:

$$X(3k') = \sum_{i=0}^{M} x(i)\exp\left(\frac{-j2\pi ik'}{256}\right) + \sum_{i=M+1}^{255} x(i)\exp\left(\frac{-j2\pi ik'}{256}\right) \quad \text{Eq. 2}$$

$$X(3k') = \sum_{i=0}^{255} x(i)\exp\left(\frac{-j2\pi ik'}{256}\right) \quad \text{Eq. 3}$$

Eq. 3 is a 256-point FFT, which illustrates that rotation and zero-padding of a scattered pilot based channel impulse response does not change the computed channel frequency response at the scattered pilot carrier frequencies.

Returning to FIG. 7, at 712, a second channel frequency response is computed from the zero-padded orientation of the channel impulse response. The second channel frequency response may have a frequency spacing of $1/T_u$.

At 714, components of the second channel frequency that correspond to frequency locations of the parameter carriers are identified.

At 716, a correlation is computed between the identified components of the second channel frequency response and the raw channel frequency response estimates of the parameter carriers.

The modulation-removed parameter carriers may be represented as:

$$\{U(k), k \in S\} \quad \text{Eq. 4}$$

The correlation at 716 may include computing a sum of products, such as with Eq. 5:

$$\text{Prod\_Sum} = \Sigma_{k \in S}\text{Real}\{U(k)X^*(k)\} \quad \text{Eq. 5}$$

In Eq. 5, the asterisk denotes a complex conjugation, and S is the set of frequency locations of the modulation-removed carriers.

Alternatively, or additionally, the correlation at 716 may include determining a difference or error value, such as with Eq. 6.

$$\text{Err\_Sum} = \Sigma_{k \in S}|U(k)-X(k)|^2 \quad \text{Eq. 6}$$

At 718, one or more additional orientations of the channel impulse response may be evaluated.

Where all possible orientations of the channel impulse response are to be evaluated, M may be initialized to a maximum value and recursively decremented for each orientation until M reaches zero. For example, where the channel impulse response includes 256 points, M may be initialized to 256 and decremented towards zero. Alternatively, M may be initialized to zero and incremented until M reaches a maximum value. Alternatively, M may be selectively controlled to evaluate a subset of orientations.

At 720, an orientation of the channel impulse response is identified as a correct or optimum orientation based on the correlation at 716. The identified orientation may be used for symbol timing recovery and/or channel equalization.

Where the correlating at 716 includes computing a sum of products, the identifying at 720 may include identifying a greatest sum of products. Where the correlating at 716 includes determining a difference or error value, the identifying at 720 may include identifying a smallest error.

An FFT may be performed at 712 for each zero-padded orientation of the channel impulse response. Alternatively, a channel frequency response may be computed for a zero-padded first orientation of the channel impulse response, and thereafter, channel frequency components of additional zero-padded orientations may be computed from components of preceding orientations, such as disclosed below with respect to FIGS. 13 and 14.

Figure 14:
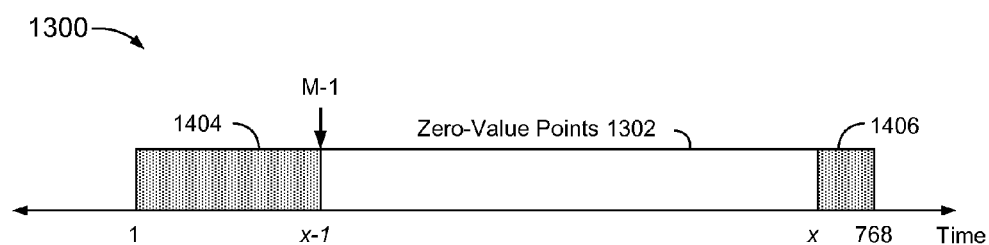
FIG. 14 is a graphic depiction of the channel impulse response of FIG. 13, zero padded at M−1.

FIG. 14 is another graphic depiction of channel impulse response 1300 of FIG. 13. In FIG. 13, zero-value points 1302 are inserted at M, between portions 1304 and 1306 of channel impulse response 1300. In FIG. 14, zero-value points 1302 are inserted at M−1, between portions 1404 and 1406.

In accordance with Eq. 1 above, a channel frequency response may be computed from a zero-padded first orientation of a channel impulse response, such as illustrated in FIG. 13, as:

$$X_M(k) = \sum_{i=0}^{M} x(i)\exp\left(\frac{-j2\pi ik}{768}\right) + \sum_{i=M+513}^{767} x(i-512)\exp\left(\frac{-j2\pi ik}{768}\right) \quad \text{Eq. 7}$$

Also in accordance with Eq. 1, a channel frequency response may be computed from a zero-padded second orientation of the channel impulse response, such as illustrated from FIG. 14, as:

$$X_{M-1}(k) = \sum_{i=0}^{M-1} x(i)\exp\left(\frac{-j2\pi ik}{768}\right) + \sum_{i=M-1+513}^{767} x(i-512)\exp\left(\frac{-j2\pi ik}{768}\right) \quad \text{Eq. 8}$$

Alternatively, Eq. 8 may be derived from Eq. 7 as illustrated in Eq. 9:

$$X_{M-1}(k) = X_M(k) + x(M) \cdot \left( \exp\left( \frac{-j2\pi(M+512)k}{768} \right) - \exp\left( \frac{-j2\pi Mk}{768} \right) \right) \quad \text{Eq. 9}$$

In other words, channel frequency response components of the zero-padded second orientation of the channel impulse response of FIG. 14 may be computed from components of the channel frequency response computed for FIG. 13, by addition of a term and subtraction of a term. Eq. 9 may be used to compute channel frequency responses components for multiple values of M, from a single FFT. This may reduce computation time and resource consumption.

Eq. 9 may be computed only with respect to values k in a set of modulation-removed parameter carriers, k∈S. The number of parameter carriers may be relatively small, which may further reduce resource consumption. For example, a digital video broadcast signal may include approximately 8 TPS carriers within a 768 carrier range.

Method 700 may thus be performed recursively for multiple values of M, utilizing a FFT operation to compute a channel frequency response of a zero-padded first orientation of the channel impulse response at 712, and thereafter selected channel frequency response components may be computed for additional zero-padded orientations of the channel impulse response from components of preceding orientations. An example is disclosed below with respect to FIG. 15.

Figure 15:
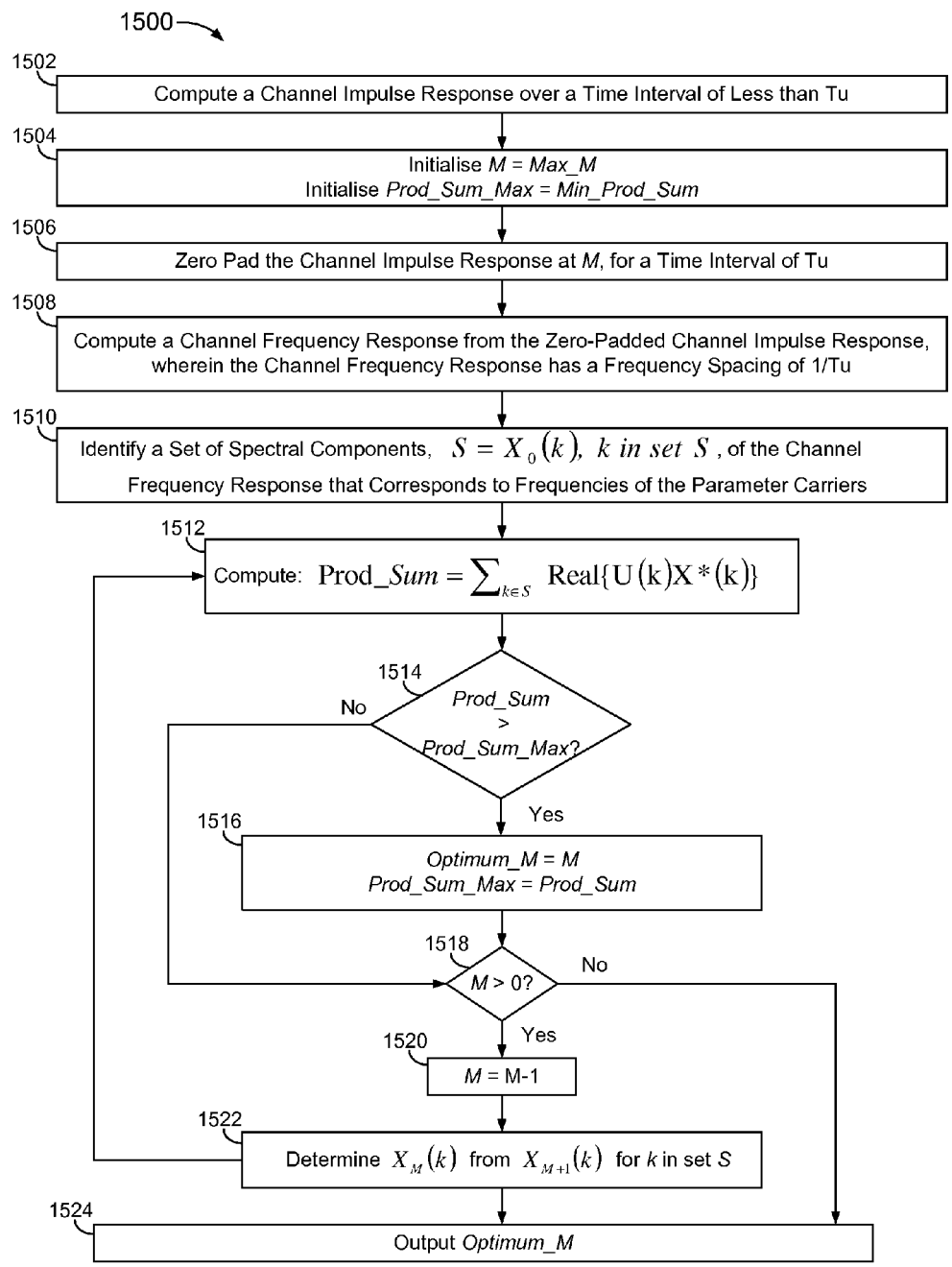
FIG. 15 is a flowchart of another method of resolving cyclic ambiguity in a channel impulse response.

FIG. 15 is a flowchart of a method 1500 of resolving cyclic ambiguity in a channel impulse response.

At 1502, a channel impulse response is computed over a time interval of less than Tu. For example, a 256-point channel impulse response may be computed from a 256-point, scattered pilot based channel frequency response, over an interval of Tu/3, such as described above.

At 1504, M is initialized to a maximum value, such as 256, and a correlation metric Prod_Sum_Max may be initialized to a minimum value, illustrated here as Min_Prod_Sum.

At 1506, the channel impulse response is zero-padded at point M, corresponding to a first orientation. The zero-padding may include 512 zero-valued samples to provide a 768-point channel impulse response, which may correspond to an interval of Tu.

At 1508, a channel frequency response is computed from the zero-padded first orientation of the channel impulse response. The channel frequency response may be computed as a 768-point FFT, and may have a frequency spacing of 1/Tu. The 768-point FFT may be computed with a cascade of a 256-point FFT and a 3-point discrete Fourier Transform (DFT).

At 1510, spectral components at frequencies of the parameter carriers are identified from the channel frequency response computed at 1508. The spectral components may be represented as a set $X_M(k)$, for M=256.

At 1512, a sum of products, illustrated here as Prod_Sum, is computed from the spectral components identified at 1510 and from raw channel estimates of parameter carriers, such as described in one or more examples above.

At 1514, the sum of products, Prod_Sum, is compared to Prod_Sum_Max. For a first iteration of 1514, Prod_Sum is greater than the initialized minimum value of Prod_Sum_Max=Min_Prod_Sum, and processing proceeds to 1516. In a subsequent iteration, if Prod_Sum is less than Prod_Sum_Max, processing proceeds to 1518.

At 1516, Optimum_M is set to the current orientation or value of M, and Prod_Sum_Max is set to the current Prod_Sum computed at 1512.

At 1518, when M is greater than zero, M is decremented at 1520.

At 1522, frequency response spectral components at the parameter carrier frequencies are computed for another zero-padded orientation of the channel impulse response from a preceding set of frequency response components, such as described above with respect to Eq. 9.

Processing then returns to 1512, where a sum of products is computed from the spectral components computed at 1522 and the raw channel estimates of parameter carriers.

Returning to 1518, when M is not greater than zero, indicating that all zero-padded orientations of the channel impulse response have been evaluated, Optimum_M is output at 1524 as an optimum zero padding location or orientation of the channel impulse response computed at 1502.

An optimum orientation or zero-padding location of the channel impulse response may be computed every symbol or less frequently. For a relatively stationary environment, such as a stationary digital video receiver environment where a transmission channel may change relatively slowly or infrequently, an optimum zero-padding location may be computed relatively infrequently, such as every 16 symbols. In a mobile reception environment, an optimum zero-padding location may be computed more frequently.

An optimum zero-padding location or orientation of a channel impulse response may be used for symbol timing recovery, including inter-symbol-interference (ISI) minimisation, and/or for channel equalization.

For channel equalization, points of a scattered pilot based channel frequency response may be frequency interpolated to estimate unknown points. If the channel impulse response is not centered properly, a linear frequency interpolation may result in aliasing of impulse response and hence distortion of frequency domain channel response. As disclosed below with respect to FIG. 16, a frequency domain phase slope adjustment may be determined as a function of an optimal time domain shift needed to centre the channel impulse response.

Figure 16:
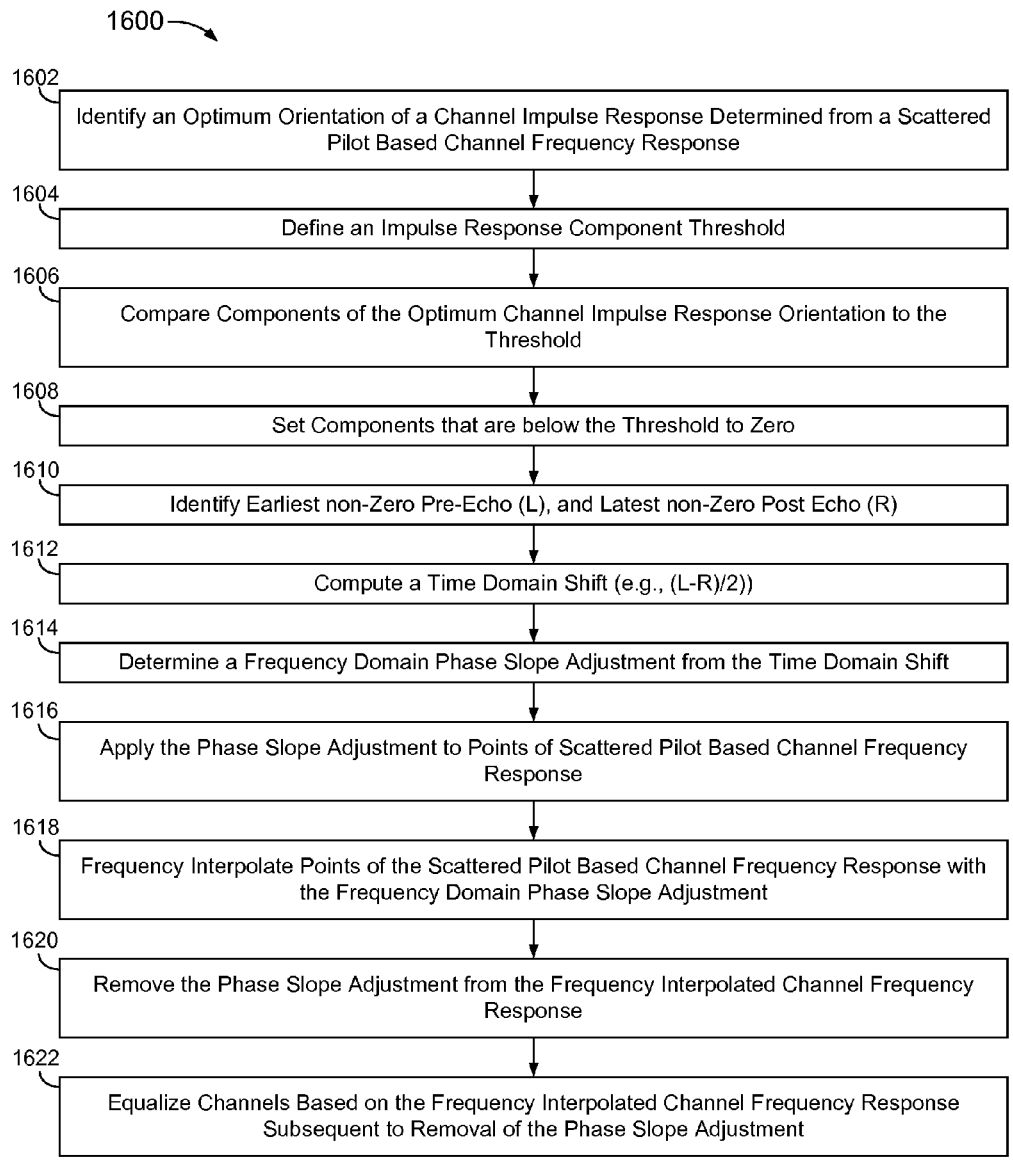
FIG. 16 is a flowchart of a method of determining a frequency domain phase slope adjustment as a function of a channel impulse response.

FIG. 16 is a flowchart of a method 1600 of determining a frequency domain phase slope adjustment as a function of an optimum channel impulse response orientation.

At 1602, an optimum orientation of a channel impulse response is identified, such as disclosed in one or more examples above.

At 1604, a threshold may be set to measure components of the channel impulse response identified at 1602. The threshold may be determined with respect to a main path or largest magnitude component of the channel impulse response. The threshold may be set to, for example, 30 dB below the magnitude of the main path component.

At 1606, magnitudes of components of the channel impulse response are compared to the threshold.

At 1608, magnitudes that fall below the threshold may be set to zero. For example, magnitudes that are less than 1/32 of the largest magnitude may be set to zero.

The thresholding, comparing, and zeroing at 1604, 1606, and 1608, may serve to reduce the number of components to be processed at 1610. The thresholding, comparing, and zeroing at 1604, 1606, and 1608, may be omitted.

At 1610, locations or positions of non-zero components of the identified channel impulse response are examined to identify earliest pre echo and latest post echo.

Figure 17:
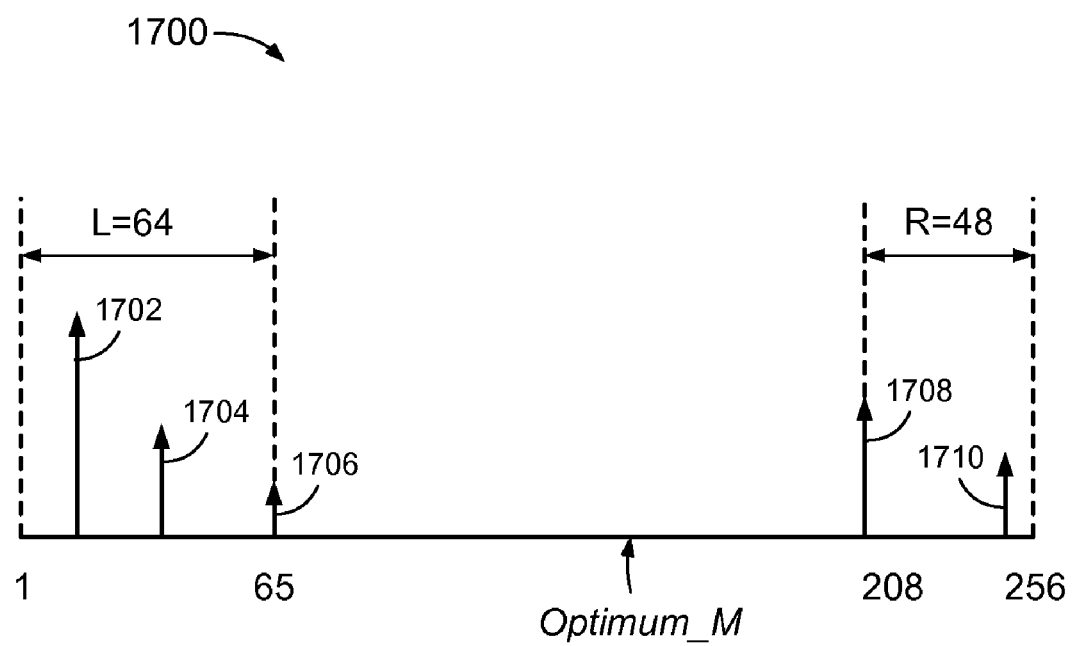
FIG. 17 is a graphic depiction of a channel impulse response.

FIG. 17 is a graphic depiction of a channel impulse response 1700, including post-echoes 1702, 1704, and 1706 within a post-echo point span L to the left of an optimal zero padding location Optimum_M, and pre-echoes 1708 and 1710 within a pre-echo point span R to the right of Optimum_M.

At 1612, a time domain shift is computed to centre the impulse response based on the L and R point spans. The time domain shift may be computed as (L−R)/2.

For example, where L spans points 1 through 65, and R spans points 208 through 256, L equals 65−1=64, R equals 256−208=48, and the time domain shift (L−R)/2 equals 8, which corresponds to 8 points of 256 point channel impulse response 1700, in the direction of post-echo span L. Where the 256 points of channel impulse response 1700 correspond to Tu/3, the 8 points correspond to a time shift of (Tu/3)·(8/256)=Tu/96, forward in time.

At 1614, a frequency domain phase slope adjustment is determined as a function of the time domain shift. The frequency domain phase slope adjustment may be determined as proportional to the time domain shift.

At 1616, points of the scattered pilot based channel frequency response are slope adjusted to centre the impulse response.

At 1618, the phase slope adjusted points of the channel frequency response are frequency interpolated.

At 1620, the phase slope adjustment is removed from the frequency interpolated channel frequency response to obtain a correct channel frequency response for all carrier locations.

At 1622, channel equalization is performed as a function of the interpolated channel frequency response, subsequent to removal of the phase slope adjustment.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, and/or a combination of integrated circuit packages. The terms software, code, and instructions, as used herein, refers to a computer program product including a computer readable medium having computer program logic stored therein to cause a computer system to perform one or more functions in response thereto.

Figure 18:
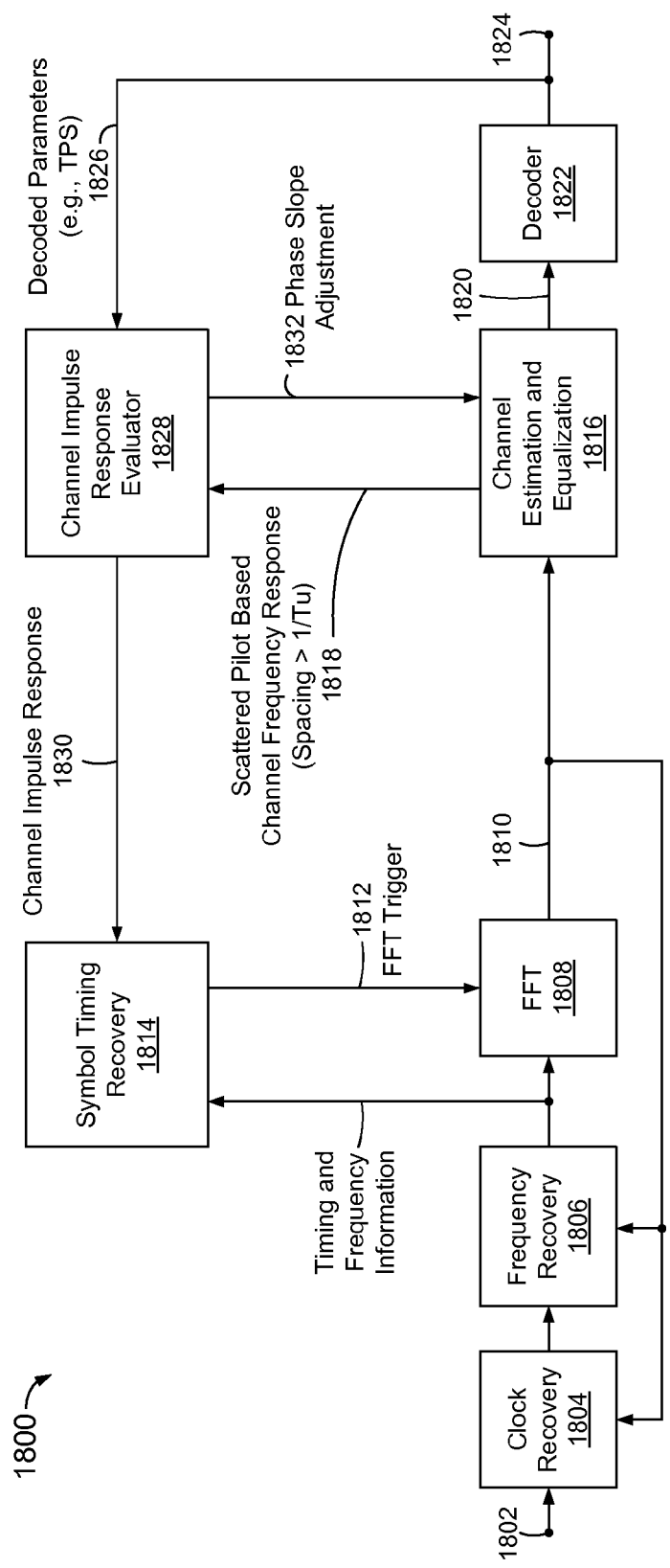
FIG. 18 is a block diagram of a system to resolve cyclic ambiguity in a channel impulse response.

FIG. 18 is a block diagram of a receiver system 1800 to resolve cyclic ambiguity in a channel impulse response.

System 1800 includes a clock recovery system 1804 to recover clock information, and a frequency recovery system 1806 to recover frequency information from a digitized signal 1802. Digitized signal 1802 may represent multiple instances of an OFDM signal, such as described in one or more examples above.

System 1800 further includes a FFT module 1808 to compute frequency domain samples 1810, in response to a FFT trigger 1812.

System 1800 further includes a channel estimation and equalization system 1816 to estimate a channel frequency response 1818 from scattered pilots and/or continuous pilots, perform channel equalization, and output equalized samples 1820.

System 1800 further includes a decoder 1822 to decode data 1824 from equalized samples 1820. Decoder 1822 may include a low density parity check (LDPC) decoder.

Digitized signal 1802 may include one or more parameter carriers, and system 1800 may be configured to decode parameters 1826 from the one or more parameter carriers.

System 1800 further includes a symbol timing recovery system 1814 to control FFT trigger 1812. An initial FFT trigger point may be based on an auto-correlation operation, which may be sufficient to permit system 1800 to identify scattered pilot locations to estimate scattered pilot based channel frequency response 1818, and to decode parameters 1826 from parameter carriers. Symbol timing recovery system 1814 may be configured to adjust FFT trigger 1812, such as to reduce ISI.

System 1800 may include a channel impulse response evaluator 1828 to determine a channel impulse response from scattered pilot based channel frequency response 1818, resolve cyclic ambiguity of channel impulse response 1818, and output a corresponding optimum orientation channel impulse response 1830. Channel impulse response evaluator 1828 may be further configured to compute a phase slope adjustment 1832.

Figure 19:
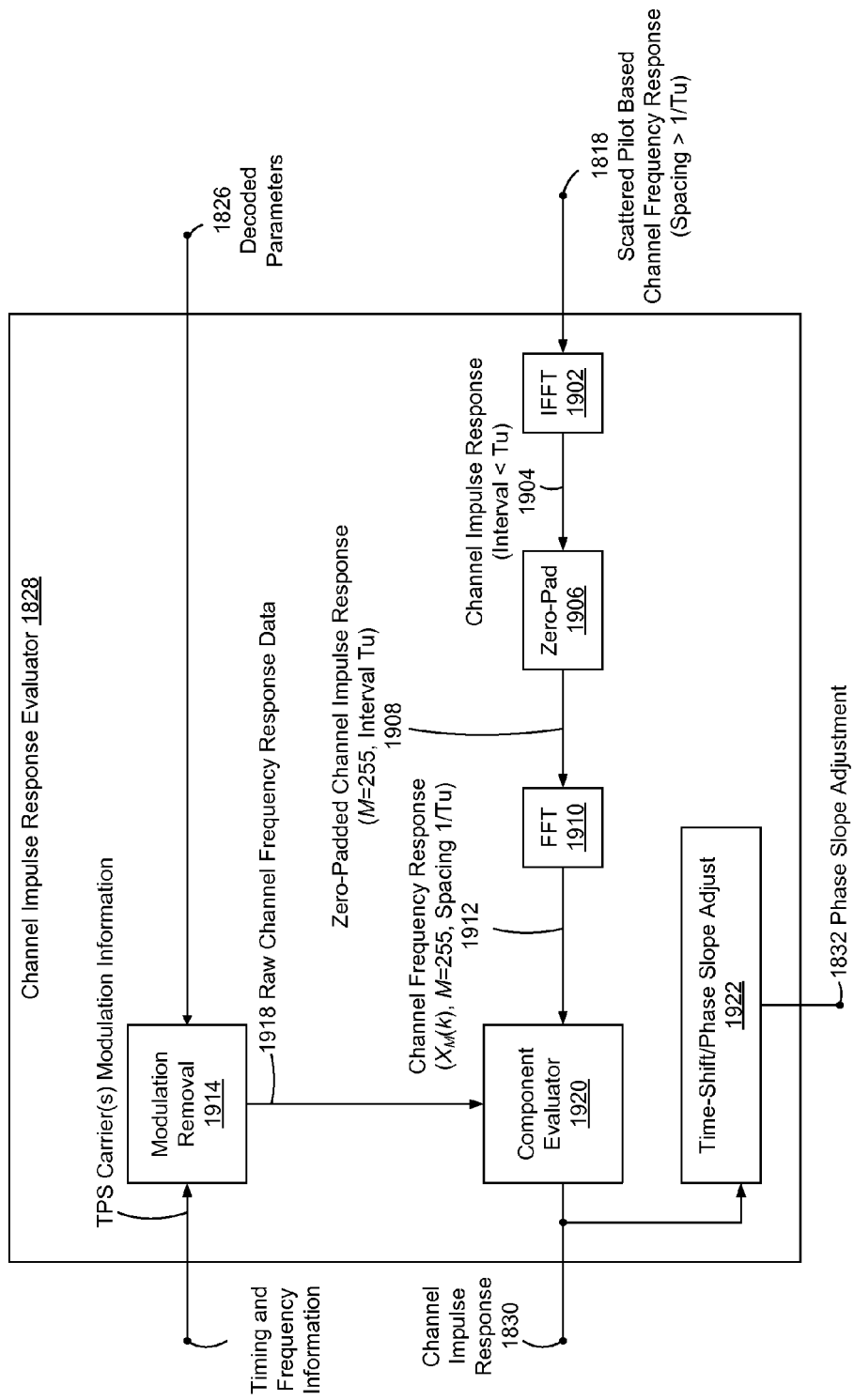
FIG. 19 is a block diagram of channel impulse response evaluator of in FIG. 17.

FIG. 19 is a block diagram of channel impulse response evaluator 1828, including an IFFT module 1902 to compute a channel impulse response 1904 from scattered pilot based channel frequency response 1818. Evaluator 1828 further includes a zero-pad module 1906 to zero-pad one or more orientations of channel impulse response 1904, and a FFT module 1910 to compute a channel frequency response 1912 from zero-padded channel impulse response 1908, such as described in one or more examples above.

Evaluator 1828 may compute a channel frequency response 1912 for each of multiple zero-padded orientations of channel impulse response 1904. Alternatively, evaluator 1828 may compute channel frequency response 1912 for a zero-padded first orientation of channel impulse response 1904, such as for M=256. Thereafter, channel frequency response components of other zero-padded orientations may be computed as disclosed above with respect to Eq. 9.

Evaluator 1828 may include a modulation removal module 1914 to remove data modulation from parameter carriers, and to output corresponding raw channel frequency response data 1918.

Evaluator 1828 may include a component evaluator 1920 to evaluate components of channel frequency responses 1912 relative to raw channel frequency response data 1918, and to output optimum orientation channel impulse response 1830.

Channel impulse response evaluator 1828 may include a time-shift/phase slope adjustment module 1922 to compute frequency domain phase slope adjustment 1832 from optimum orientation channel impulse response 1830.

Figure 20:
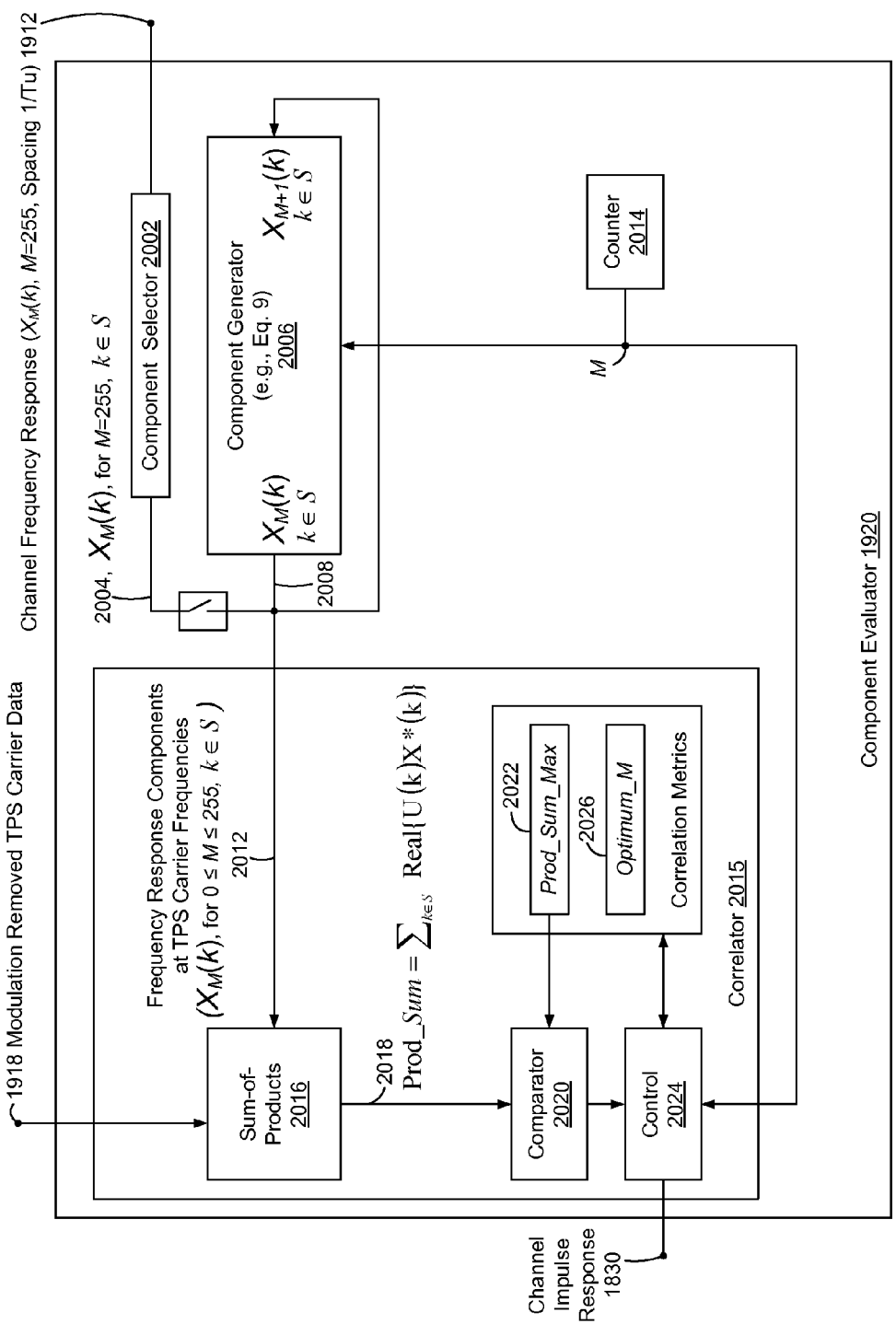
FIG. 20 is a block diagram of spectral component evaluator of in FIG. 18.

FIG. 20 is a block diagram of component evaluator 1920, including a component selector 2002 to receive channel frequency response 1912, corresponding to a zero-padded first orientation of channel impulse response 1904 (FIG. 19), and to output components 2004 that correspond to frequencies of parameter carriers, such as disclosed above with respect to 1510 in FIG. 15. Components 2004 are provided to a correlator 2015 as components 2012.

Component evaluator 1920 further includes a component generator 2006 to compute channel frequency response components 2008, at parameter carrier frequencies, for other zero-padded orientations of channel impulse response 1904, such as disclosed above with respect to Eq. 9.

For example, channel frequency response 1912 may correspond to a zero-padded, M=256, orientation of channel impulse response 1904, and component selector 2002 may output components 2004, $X_M(k)$ for M=256, k∈S. Thereafter, component generator 2006 may compute frequency response components 2008 for other values of M as a function of components 2012 of preceding values of M.

Component evaluator 1920 may include a counter 2014 to control a value of M.

Correlator 2015 may be configured to correlate frequency response components 2012 with raw channel frequency response data 1918.

Correlator 2015 may include a sum-of-products module 2016 to compute a sum-of-products 2018 from frequency response components 2012 and raw data 1918, such as disclosed above with respect to Eq. 5.

Correlator 2015 may include a comparator 2020 to compare sum-of-products 2018, illustrated here as Prod_Sum, to a Prod_Sum_Max value 2022, such as disclosed above with respect to 1514 in FIG. 15.

Correlator 2015 may include a control module 2024 to initialize values Prod_Sum_Max 2022 and Optimum_M 2026, and to replace Prod_Sum_Max 2022 and Optimum_M 2026, with Prod_Sum 2018 and M, respectively, when Prod_Sum 2018 is greater than Prod_Sum_Max, such as disclosed above with respect to 1516 in FIG. 15.

Control module 2024 may be configured to identify Optimum_M as indicative of an optimum orientation of channel impulse response 1904 when M=0, and to output a corresponding optimum orientation channel impulse response 1830.

Figure 21:
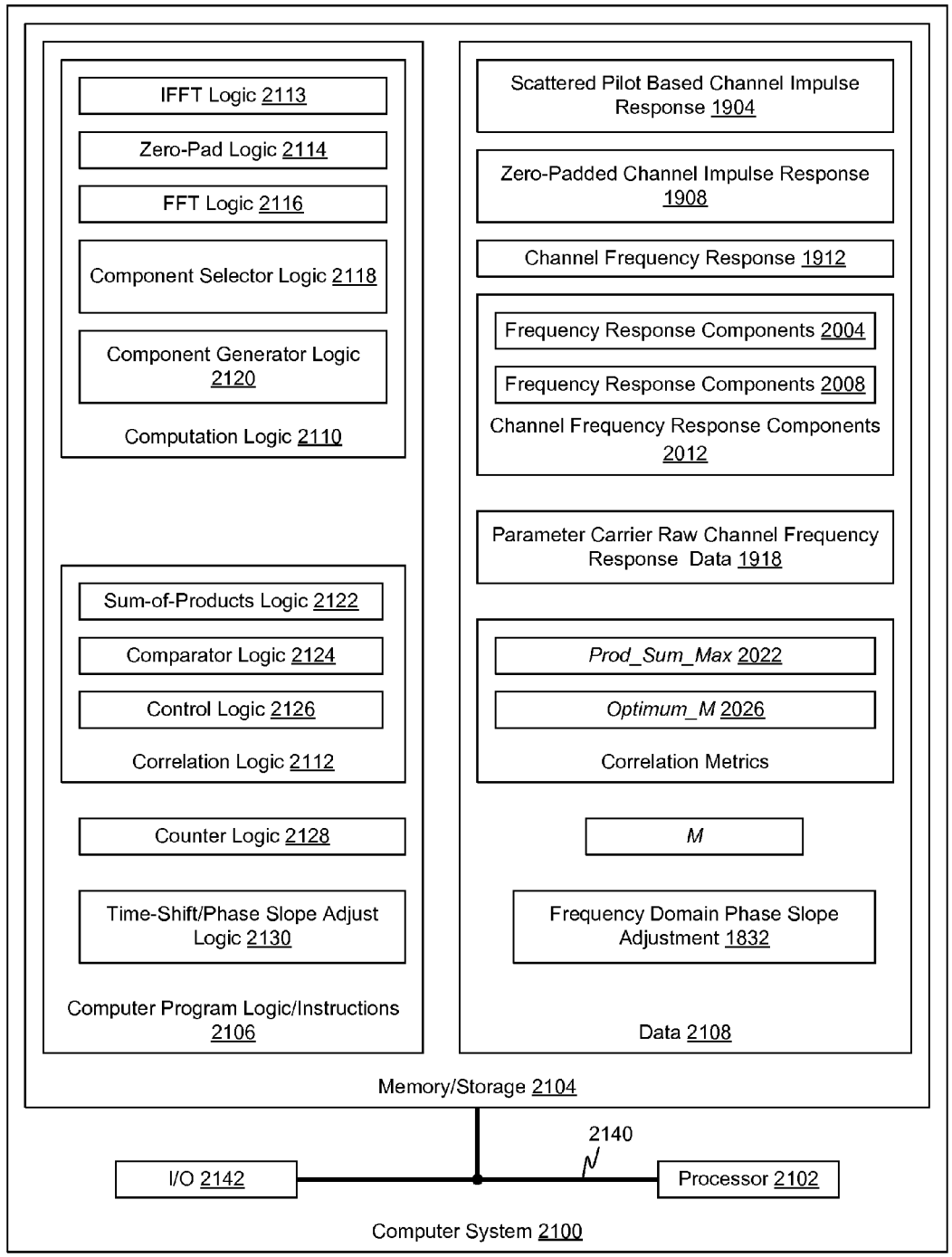
FIG. 21 is a block diagram of a computer system configured to resolve cyclic ambiguity in a channel impulse response.

FIG. 21 is a block diagram of a computer system 2100 configured to resolve cyclic ambiguity of a channel impulse response. Computer system 2100 may be configured to implement one or more features disclosed above with respect to FIGS. 18, 19, and/or 20.

Computer system 2100 includes one or more computer instruction processing units, illustrated here as a processor 2102, to execute computer program product logic (hereinafter, "logic").

Computer system 2100 includes one or more of memory, cache, registers, and storage (hereinafter, "memory") 2104, including a computer readable medium having computer program product logic 2106 stored thereon, to cause processor 2102 to perform one or more functions in response thereto.

Memory 2104 further includes data 2108 to be used by processor 2102 in executing logic 2106, and/or generated by processor 2102 in response to execution of logic 2106.

In the example of FIG. 21, logic 2106 includes computation logic 2110 to cause processor 2102 to compute channel frequency response components 2012 for zero-padded orientations of channel impulse response 1904.

Logic 2106 further includes correlation logic 2112 to cause processor 2102 to correlate channel frequency response components 2012, for each zero-padded orientation, with raw channel frequency response data 1918, and to identify an optimum orientation of channel impulse response 1904 based on the correlations.

Computation logic 2110 may include IFFT logic 2113 to cause processor 2102 to compute channel impulse response 1904 from scattered pilot based channel frequency response 1818 (FIG. 18).

Computation logic 2110 may include zero-pad logic 2114 to cause processor 2102 to zero-pad a first orientation of channel impulse response 1904, to generate zero-padded channel impulse response 1908.

Computation logic 2110 may include FFT logic 2116 to cause processor 2102 to compute channel frequency response 1912 from zero-padded channel impulse response 1908.

Computation logic 2110 may include component selector logic 2118 to cause processor 2102 to identify frequency components 2004 of channel frequency response 1912 that correspond to frequencies of parameter carriers.

Computation logic 2110 may include component generator logic 2120 to cause processor 2102 to compute frequency response components 2008 for additional zero-padded orientations of channel impulse 1904, from frequency response components 2012, in accordance with Eq. 9.

Correlation logic 2112 may include sum-of-products logic 2122 to cause processor 2102 to compute, for each zero-padded orientation of channel impulse response 1904, a sum of products of the corresponding channel frequency response components 2012 and raw data 1918.

Correlation logic 2112 may include comparator logic 2124 and control logic 2126 to cause processor 2102 to identify a largest one of the sum of products, such as described above with respect to Prod_Sum_Max 2022 and Optimum_M 2026.

Logic 2106 may include counter logic 2128 to cause processor 2102 to increment or decrement M.

Logic 2106 may include time-shift/phase slope adjust logic 2130 to cause processor 2102 to compute a time domain shift from an optimum orientation of channel impulse response 1904, and to compute frequency domain phase slope adjustment 1832 from the time domain shift.

Computer system 2100 may include a communications infrastructure 2140 to communicate amongst devices of computer system 2100, and an input/output system 2142 to communicate with one or more devices external of computer system 2100.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. A receiver, comprising:
a channel estimation module to compute a scattered pilot based channel frequency response corresponding to multiple instances of a multi-carrier signal;
a decoder to decode the multi-carrier signal, including to decode parameters from parameter carriers of the multi-carrier signal in accordance with predetermined modulation and encoding schemes;
a modulation removal module to obtain raw channel frequency response data from the decoded parameter carriers; and
a channel impulse response evaluator to compute a channel impulse response from the channel frequency response, and to determine and correlate channel frequency response components for each of a plurality of zero-padded orientations of the channel impulse response with the raw channel frequency response data of the parameter carriers to identify an optimum orientation of the channel impulse response.

2. The receiver of claim 1, wherein the channel impulse response evaluator is configured to compute the channel impulse response over a time interval of less than an effective symbol duration of the multi-carrier signal, and to zero-pad the channel impulse response to a time interval of approximately the effective symbol duration.

3. The receiver of claim 1, wherein the channel impulse response evaluator includes:
- a zero-pad module to zero-pad a first orientation of the channel impulse response;
- a Fast Fourier Transform (FFT) module to compute a first orientation channel frequency response from the zero-padded first orientation of the channel impulse response;
- a component selector to identify components of the first orientation channel frequency response that correspond to frequencies of the parameter carriers; and
- a correlator to evaluate the identified components of the first orientation channel frequency response with respect to the raw channel frequency response data of the parameter carriers.

4. The receiver of claim 3, wherein the channel impulse response evaluator further includes:
- a component generator to compute channel frequency response components of another zero-padded orientation of the channel impulse response from frequency response components of the zero-padded first orientation of the channel impulse response.

5. The receiver of claim 3, wherein the correlator includes:
- a sum-of-products module to compute, for each zero-padded orientation of the channel impulse response, a sum of products of the corresponding channel frequency response components and the raw channel frequency response data of the parameter carriers; and
- a comparator to identify a largest one of the sum of products as corresponding to the optimum orientation of the channel impulse response.

6. The receiver of claim 1, further including:
- a time-shift to phase-slope adjust module to compute a time domain shift to center the optimum orientation of the channel impulse response, and to determine a frequency domain phase slope adjustment as a function of the time domain shift.

7. The receiver of claim 1, further including:
- a frequency domain phase slope adjustment module to apply the phase slope adjustment to points of the scattered pilot based channel frequency response and to remove the phase slope adjustment from a frequency interpolated channel frequency response;
- a frequency interpolator to frequency interpolate between the phase slope adjusted points to generate the phase slope adjusted channel frequency response having a time interval of approximately an effective symbol duration of the multi-carrier signal; and
- a channel equalizer to equalize channels of the multi-carrier signal as a function of the frequency interpolated channel frequency response subsequent to removal of the phase slope adjustment.

8. A method, comprising:
- computing a channel frequency response from scattered pilots of multiple instances of a multi-carrier signal;
- decoding the multi-carrier signal, including decoding parameters from parameter carriers of the multi-carrier signal in accordance with predetermined modulation and encoding schemes;
- removing data modulation from the decoded parameter carriers to obtain raw channel frequency response data; and
- computing a channel impulse response from the channel frequency response;
- determining channel frequency response components for each of a plurality of zero-padded orientations of the channel impulse response; and
- correlating the frequency response components with the raw channel frequency response data of the parameter carriers to identify an optimum orientation of the channel impulse response;
- wherein the computing of the channel frequency response, the decoding, the removing, the computing of the channel impulse response, the determining, and the correlating are performed in one or more suitably configured systems.

9. The method of claim 8, wherein:
- the computing of the channel impulse response includes computing the channel impulse response over a time interval of less than an effective symbol duration of the multi-carrier signal; and
- the determining of the channel frequency response components includes zero-padding the channel impulse response to a time interval of approximately the effective symbol duration.

10. The method of claim 8, wherein the determining of the channel impulse response includes:
- zero-padding a first orientation of the channel impulse response;
- computing a first orientation channel frequency response from the zero-padded first orientation of the channel impulse response; and
- identifying components of the first orientation channel frequency response that correspond to frequencies of the parameter carriers;
- wherein the correlating includes evaluating the identified components of the first orientation channel frequency response with respect to the raw channel frequency response data of the parameter carriers.

11. The method of claim 10, wherein the determining of the channel frequency response components includes:
- computing channel frequency response components of another zero-padded orientation of the channel impulse response from frequency response components of the zero-padded first orientation of the channel impulse response.

12. The method of claim 10, wherein the correlating includes:
- computing, for each zero-padded orientation of the channel impulse response, a sum of products of the corresponding channel frequency response components and the raw channel frequency response data of the parameter carriers; and
- identifying a largest one of the sum of products as corresponding to the optimum orientation of the channel impulse response.

13. The method of claim 8, further including:
- computing a time domain shift to center the optimum orientation of the channel impulse response; and
- determining a frequency domain phase slope adjustment as a function of the time domain shift.

14. The method of claim 13, further including:
- applying the phase slope adjustment to points of the scattered pilot based channel frequency response;
- interpolating between the phase slope adjusted points to provide a phase slope adjusted channel frequency response having a time interval of approximately an effective symbol duration of the multi-carrier signal;
- removing the phase slope adjustment from the frequency interpolated channel frequency response; and
- equalizing channels of the multi-carrier signal as a function of the frequency interpolated channel frequency response subsequent to removal of the phase slope adjustment.

15. A non-transitory computer readable medium encoded with a computer program, including instructions to cause a processor to:

determine and correlate channel frequency response components for each of a plurality of zero-padded orientations of a channel impulse response with raw channel frequency response data of parameter carriers to identify an optimum orientation of the channel impulse response;

wherein the channel impulse response corresponds to multiple instances of a multi-carrier signal, including the parameter carriers encoded with predetermined modulation and encoding schemes, and including scattered pilot carriers.

16. The non-transitory computer readable medium of claim 15, wherein the channel impulse response corresponds to a time interval of less than an effective symbol duration of the multi-carrier signal, and wherein the instructions include instructions to cause the processor to zero-pad the channel impulse response to a time interval of approximately the effective symbol duration.

17. The non-transitory computer readable medium of claim 15, further including instructions to cause the processor to:

zero-pad a first orientation of the channel impulse response;

compute a first orientation channel frequency response from the zero-padded first orientation of the channel impulse response;

identify components of the first orientation channel frequency response that correspond to frequencies of the parameter carriers; and evaluate the identified components of the first orientation channel frequency response with respect to the raw channel frequency response data of the parameter carriers.

18. The computer readable medium of claim 17, further including instructions to cause the processor to:

compute channel frequency response components of another zero-padded orientation of the channel impulse response from frequency response components of the zero-padded first orientation of the channel impulse response.

19. The computer readable medium of claim 15, further including instructions to cause the processor to:

compute a time domain shift to center the optimum orientation of the channel impulse response, and determine a frequency domain phase slope adjustment as a function of the time domain shift.

20. The computer readable medium of claim 19, further including instructions to cause the processor to:

apply the phase slope adjustment to points of a scattered pilot based channel frequency response and to remove the phase slope adjustment from a frequency interpolated channel frequency response;

frequency interpolate between the phase slope adjusted points to generate the frequency interpolated channel frequency response having a time interval of approximately an effective symbol duration of the multi-carrier signal; and equalize channels of the multi-carrier signal as a function of the frequency interpolated channel frequency response subsequent to removal of the phase slope adjustment.

* * * * *